United States Patent
Lieberman et al.

(10) Patent No.: US 9,832,036 B2
(45) Date of Patent: Nov. 28, 2017

(54) DUAL-MODE VEHICULAR CONTROLLER

(71) Applicant: Keystone Integrations LLC, Plymouth, MN (US)

(72) Inventors: David Lieberman, Independence, MN (US); Robert Turgeon, Plymouth, MN (US); Byron Tietjen, Baldwinsville, NY (US); Greg Gardella, Naples, FL (US)

(73) Assignee: Keystone Integrations LLC, Plymouth, MN (US)

( * ) Notice: Subject to any disclaimer, the term of this patent is extended or adjusted under 35 U.S.C. 154(b) by 0 days.

(21) Appl. No.: 15/280,566

(22) Filed: Sep. 29, 2016

(65) Prior Publication Data

US 2017/0019268 A1    Jan. 19, 2017

Related U.S. Application Data

(63) Continuation-in-part of application No. 14/320,834, filed on Jul. 1, 2014, which is a continuation of
(Continued)

(51) Int. Cl.
*H04L 12/40* (2006.01)
*B63B 69/00* (2013.01)
(Continued)

(52) U.S. Cl.
CPC ............ *H04L 12/40* (2013.01); *B63B 69/00* (2013.01); *G06F 3/1454* (2013.01); *G07C 5/008* (2013.01);
(Continued)

(58) Field of Classification Search
CPC combination set(s) only.
See application file for complete search history.

(56) References Cited

U.S. PATENT DOCUMENTS

| 5,758,300 A | 5/1998 | Abe |
| 5,797,088 A * | 8/1998 | Stamegna ........... B60R 11/0241 |
| | | 455/345 |

(Continued)

OTHER PUBLICATIONS

Del-Colle, "Why Your Smartphone Will Become Your In-Car Infotainment System," Aug. 29, 2011, Popular Mechanics, http://www.popularmechanics.com/cars/a7067/why-your-smartphone-will-become-your-in-car-infotainment-system/.
(Continued)

*Primary Examiner* — Travis Hunnings
(74) *Attorney, Agent, or Firm* — Gardella Grace P.A.

(57) ABSTRACT

A vehicular interface may include an electromechanical interface between a handheld electronic device and subsystems on a vehicular bus or network. In an illustrative embodiment, the interface may operate in a "master mode" when a handheld device, such as a tablet computer or smart-phone, is not inserted therein. In this mode the interface may serve as a master controller and accesses and controls various subsystems on a vehicle (such as engine control subsystems, media controllers, navigation systems, sensors and transducers) as a master controller. In one embodiment, when a tablet device is inserted into the interface, the interface may automatically switch to "slave mode" in which it acts as an adapter or interface between the tablet device and the vehicular subsystems.

20 Claims, 11 Drawing Sheets

Related U.S. Application Data application No. 14/248,781, filed on Apr. 9, 2014, now abandoned, which is a continuation of application No. 13/849,655, filed on Mar. 25, 2013, now Pat. No. 8,781,656, which is a continuation of application No. 13/461,751, filed on May 1, 2012, now Pat. No. 8,433,463.

(60) Provisional application No. 61/870,041, filed on Aug. 26, 2013, provisional application No. 61/623,222, filed on Apr. 12, 2012, provisional application No. 61/621,630, filed on Apr. 9, 2012, provisional application No. 61/621,495, filed on Apr. 7, 2012, provisional application No. 61/621,497, filed on Apr. 7, 2012, provisional application No. 61/617,277, filed on Mar. 29, 2012, provisional application No. 61/603,330, filed on Feb. 26, 2012, provisional application No. 61/597,045, filed on Feb. 9, 2012.

(51) Int. Cl.
| | |
|---|---|
| G07C 5/00 | (2006.01) |
| H04L 29/08 | (2006.01) |
| G06F 3/14 | (2006.01) |
| G09G 5/12 | (2006.01) |

(52) U.S. Cl.
CPC .............. *G09G 5/12* (2013.01); *H04L 67/025* (2013.01); *H04L 67/12* (2013.01); *G09G 2330/027* (2013.01); *G09G 2360/04* (2013.01); *G09G 2370/022* (2013.01); *G09G 2380/10* (2013.01); *H04L 2012/40286* (2013.01)

(56) References Cited

U.S. PATENT DOCUMENTS

| | | | |
|---|---|---|---|
| 5,878,276 | A | 3/1999 | Aebli et al. |
| 5,991,640 | A | 11/1999 | Lilja et al. |
| 5,999,867 | A | 12/1999 | Rogers et al. |
| 6,161,066 | A | 12/2000 | Wright et al. |
| 6,181,992 | B1 | 1/2001 | Gume et al. |
| 6,298,376 | B1 | 10/2001 | Rosner et al. |
| 6,757,521 | B1 | 6/2004 | Ying |
| 6,898,525 | B1 | 5/2005 | Minelli |
| 7,113,449 | B2 | 9/2006 | Fairbairn |
| 7,299,129 | B2 | 11/2007 | Kalis et al. |
| 7,398,151 | B1 | 7/2008 | Burrell et al. |
| 7,686,396 | B2 | 3/2010 | Schaaf |
| 7,739,723 | B2 | 6/2010 | Rogers et al. |
| 7,784,707 | B2 | 8/2010 | Witty et al. |
| 7,870,092 | B2 | 1/2011 | Scott et al. |
| 7,937,484 | B2 | 5/2011 | Julia et al. |
| 7,987,492 | B2 | 7/2011 | Liwerant et al. |
| 8,095,566 | B2 | 1/2012 | Thomas |
| 8,112,810 | B2 | 2/2012 | Risan et al. |
| 8,112,815 | B2 | 2/2012 | Risan et al. |
| 8,122,248 | B2 | 2/2012 | Risan et al. |
| 8,296,453 | B1 | 10/2012 | Margulis |
| 8,375,019 | B2 | 2/2013 | Salinas |
| 8,774,782 | B2 | 7/2014 | Renou |
| 2002/0156832 | A1 | 10/2002 | Duri et al. |
| 2003/0156097 | A1 | 8/2003 | Kakihara et al. |
| 2004/0249860 | A1 | 12/2004 | Stechschulte et al. |
| 2005/0005298 | A1 | 1/2005 | Tranchina |
| 2005/0144195 | A1 | 6/2005 | Hesselink et al. |
| 2005/0144200 | A1 | 6/2005 | Hesselink et al. |
| 2005/0149481 | A1 | 7/2005 | Hesselink et al. |
| 2005/0239434 | A1 | 10/2005 | Marlowe |
| 2006/0155431 | A1* | 7/2006 | Berg ............... B60K 35/00 701/2 |
| 2006/0184613 | A1 | 8/2006 | Stienessen et al. |
| 2006/0248162 | A1 | 11/2006 | Kawasaki |
| 2007/0100806 | A1 | 5/2007 | Ramer et al. |
| 2007/0143798 | A1 | 6/2007 | Jira et al. |
| 2007/0179955 | A1 | 8/2007 | Croft et al. |
| 2007/0198633 | A1 | 8/2007 | Thibeault et al. |
| 2007/0203646 | A1 | 8/2007 | Diaz et al. |
| 2007/0233732 | A1 | 10/2007 | Porter et al. |
| 2008/0004904 | A1 | 1/2008 | Tran |
| 2008/0163315 | A1 | 7/2008 | Liwerant et al. |
| 2008/0163316 | A1 | 7/2008 | Liwerant et al. |
| 2008/0201225 | A1 | 8/2008 | Maharajh et al. |
| 2008/0299953 | A1 | 12/2008 | Rao |
| 2009/0143937 | A1 | 6/2009 | Craig |
| 2010/0063670 | A1 | 3/2010 | Brzezinski et al. |
| 2010/0097239 | A1 | 4/2010 | Campbell et al. |
| 2010/0114968 | A1 | 5/2010 | Dean |
| 2010/0125605 | A1 | 5/2010 | Nair et al. |
| 2010/0231352 | A1 | 9/2010 | Bolton et al. |
| 2010/0297941 | A1 | 11/2010 | Doan et al. |
| 2011/0113097 | A1 | 5/2011 | Takeuchi |
| 2011/0118934 | A1 | 5/2011 | Lowrey et al. |
| 2011/0128446 | A1 | 6/2011 | Woo |
| 2011/0144912 | A1 | 6/2011 | Lee et al. |
| 2011/0145863 | A1 | 6/2011 | Alsina et al. |
| 2011/0153150 | A1 | 6/2011 | Drew et al. |
| 2011/0172842 | A1 | 7/2011 | Makhota et al. |
| 2011/0185390 | A1 | 7/2011 | Faenger et al. |
| 2011/0208834 | A1* | 8/2011 | Nagano ............... G08G 1/0962 709/217 |
| 2011/0213515 | A1 | 9/2011 | Haymart et al. |
| 2011/0234117 | A1 | 9/2011 | Knapp et al. |
| 2011/0257973 | A1 | 10/2011 | Chutorash et al. |
| 2011/0263293 | A1 | 10/2011 | Blake et al. |
| 2011/0264835 | A1 | 10/2011 | Chen et al. |
| 2011/0265003 | A1 | 10/2011 | Schubert et al. |
| 2012/0028680 | A1 | 2/2012 | Breed |
| 2012/0053759 | A1 | 3/2012 | Lowrey et al. |
| 2012/0064829 | A1 | 3/2012 | Hart et al. |
| 2012/0087078 | A1 | 4/2012 | Medica et al. |
| 2012/0095643 | A1 | 4/2012 | Bose et al. |
| 2012/0117290 | A1 | 5/2012 | Sirpal et al. |
| 2012/0166676 | A1 | 6/2012 | Roper et al. |
| 2012/0172088 | A1 | 7/2012 | Kirch et al. |
| 2012/0226764 | A1 | 9/2012 | Philip et al. |
| 2012/0242687 | A1 | 9/2012 | Choi |
| 2012/0331099 | A1 | 12/2012 | Ohashi et al. |
| 2013/0027404 | A1 | 1/2013 | Samoff |
| 2013/0109374 | A1 | 5/2013 | Kwon |
| 2013/0130777 | A1 | 5/2013 | Lemay et al. |
| 2013/0179029 | A1 | 7/2013 | Wang et al. |
| 2013/0217442 | A1 | 8/2013 | Djordjevic |
| 2013/0274997 | A1 | 10/2013 | Chien |
| 2014/0078022 | A1 | 3/2014 | Dusterhoff |
| 2015/0178034 | A1 | 6/2015 | Penilla et al. |

OTHER PUBLICATIONS

Caggiani, "Samsung Doubles SD RAM Speed with LPDDR3, Available in Smartphones This Year," Feb. 23, 2012, Talk Android, http://www.talkandroid.com/93571-samsung-doubles-sdram-speed-with-lpddr3-available-in-smartphones-this-year/.

Mies et al., "Smartphone Specs Demystified," Dec. 15, 2010, PC World, http://news.yahoo.com/smartphone-specs-demystified-20101215-181000-715.html.

Fujitsu, "Graphics Display Controller for Automotive Applications MB86297/MB86276," 2006, FIND vol. 24.

Ewing, A, Car Connectivity Consortium Agenda, Mirrorlink Technology, Nov. 2012, Car Connectivity Consortium LLC, Beaverton, OR.

Aumo, A., Car Connectivity Consortium, Mirrorlink and the Connected Car, Mar. 2015, Car Connectivity Consortium LLC, Beaverton, OR.

Bruce et al., Personal Digital Assistant (PDA) based I2C bus analysis, Nov. 2003, IEEE.

AM186 EDEDLV Microcontrollers Users Manual, 1996, AMD.

MC68332 Technical Summary, 1995, Freescal Semiconductor, Inc.

Palm Z22 Product Details, Oct. 2005, Epinions.com.

Lenovo X200 Performance, 2008, Lenovo.

(56) References Cited

OTHER PUBLICATIONS

Non-Final Rejection dated Jul. 10, 2015 issued in U.S. Appl. No. 14/219,948.
Final Rejection dated Dec. 13, 2016 issued in U.S. Appl. No. 14/219,948.
Non-Final Rejection dated Jul. 16, 2015 issued in U.S. Appl. No. 14/320,834.
Final Rejection dated Dec. 21, 2015 issued in U.S. Appl. No. 14/320,834.
Non-Final Rejection dated Sep. 12, 2016 issued in U.S. Appl. No. 14/320,834.

* cited by examiner ized System/Subsystem," filed by Lieberman, et al., on Mar. 29, 2012, and U.S. Provisional Application Ser. No. 61/603,330, titled "On-Board System to Serve as Slave to a Handheld Master Device," filed by Lieberman, et al., on Feb. 26, 2012, and U.S. Provisional Application Ser. No. 61/597,045, titled "On Board System to Mate with Portable Handheld Device and Provide the Functionality of Stand-Alone Lake Mapping and Fishing Finding Devices While Further Providing On-Demand Tactical Fishing Advice, Emergency Services and Other Enhanced Functionality," filed by Lieberman, et al., on Feb. 9, 2012.

DUAL-MODE VEHICULAR CONTROLLER

CROSS-REFERENCE TO RELATED CASES

This application claims the benefit of and is a Continuation-in-Part of U.S. application Ser. No. 14/320,834, titled "Dual Mode Master/Slave Interface," filed by Lieberman, et al., on Jul. 1, 2014, which claims the benefit of U.S. Provisional Application Ser. No. 61/870,041, titled "Wallet Proxy," filed by Gardella, et al., on Aug. 26, 2013, and is a Continuation of U.S. application Ser. No. 14/248,781, titled "Vehicular Dual Mode Master/Slave Interface," filed by Lieberman, et al., on Apr. 9, 2014, which is a Continuation of U.S. application Ser. No. 13/849,655, titled "Vehicular Dual Mode Master/Slave Interface," filed by Lieberman, et al., on Mar. 25, 2013, which is a Continuation of U.S. application Ser. No. 13/461,751, titled "Vehicular Dual Mode Master/Slave Interface," filed by Lieberman, et al., on May 1, 2012 which claims the benefit of U.S. Provisional Application Ser. No. 61/623,222, titled "Interfacing Handheld Devices to Local and Remote Devices and Servers," filed by Turgeon, et al., on Apr. 12, 2012, and U.S. Provisional Application Ser. No. 61/621,630, titled "Interfacing Handheld Devices to Local and Remote Devices and Servers," filed by Turgeon, et al., on Apr. 9, 2012, and U.S. Provisional Application Ser. No. 61/621,495, titled "Phone-Book and TableBook," filed by Greg Gardella on Apr. 7, 2012, and U.S. Provisional Application Ser. No. 61/621,497, titled "Keystone Synchronization System," filed by Gardella, et al., on Apr. 7, 2012, and U.S. Provisional Application Ser. No. 61/617,277, titled "Master/Slave Interface Device (MSID) System/Subsystem," filed by Lieberman, et al., on Mar. 29, 2012, and U.S. Provisional Application Ser. No. 61/603,330, titled "On-Board System to Serve as Slave to a Handheld Master Device," filed by Lieberman, et al., on Feb. 26, 2012, and U.S. Provisional Application Ser. No. 61/597,045, titled "On Board System to Mate with Portable Handheld Device and Provide the Functionality of Stand-Alone Lake Mapping and Fishing Finding Devices While Further Providing On-Demand Tactical Fishing Advice, Emergency Services and Other Enhanced Functionality," filed by Lieberman, et al., on Feb. 9, 2012.

This application incorporates the entire contents of the foregoing application(s) herein by reference.

SUMMARY OF ILLUSTRATIVE EMBODIMENTS

A vehicular interface may include an electromechanical interface between a handheld electronic device and subsystems on a vehicular bus or network. In an illustrative embodiment, the interface may operate in a "master mode" when a handheld device, such as a tablet computer or smart-phone, is not inserted therein. In this mode the interface may serve as a master controller and accesses and controls various subsystems on a vehicle (such as engine control subsystems, media controllers, navigation systems, sensors and transducers) as a master controller. In one embodiment, when a tablet device is inserted into the interface, the interface may automatically switch to "slave mode" in which it acts as an adapter or interface between the tablet device and the vehicular subsystems. In this mode of operation, the user's exclusive interface may be through the tablet computer while the tablet computer serves as the master controller for the system.

This approach in selected embodiments can provide one or more of the following advantages. First, this system may provide enhanced functionality at reduced cost by relying on the computing power and functionality of a tablet computer that was previously acquired by the user. The interface may be configured to have limited functionality in master mode and intended to operate primarily in slave mode. Accordingly, relatively inexpensive processors, memory and display screens can be used to implement the interface because it is expected that the interface would typically be operating in slave mode. Second, this system may substantially reduce the time needed for a user to become proficient with the system. This stems from the fact that the users generally will already be familiar with their handheld device's operating system, user interface and functionality. Third, this system architecture may facilitate continuous updating and improvement by enabling software updates and new software modules to be pushed to the user's tablet PC or smart phone. Fourth, this system architecture may enable a user to port most or all of the system's functionality to another vehicle that is appropriately equipped with a compliant interface. Indeed, even when the other vehicle is not so equipped, the tablet device may still provide some or most functionality as a stand-alone unit.

The details of one or more implementations are set forth in the accompanying drawing and description below. Other features, objects, and advantages will be apparent from the description and drawings, and from the claims.

BRIEF DESCRIPTION OF FIGURES

Like reference symbols in various drawing indicate like elements.

DETAILED DESCRIPTION OF ILLUSTRATIVE IMPLEMENTATIONS

Overview of Selected Embodiments

Many modern vehicles, such as automobiles or watercraft, have a plurality of onboard sensors and display devices capable of measuring and displaying various vehicular-related data. Examples of this include depth sounders and GPS systems on watercraft. It is desirable to have the capability to interface with all the on-board devices with a relatively inexpensive, and probably previously purchased external control and display device (ECD), which, for example, could be a personal hand-held smart device, such as an iPhone® or iPad® mobile device (trademarks of Apple Inc.), or other handheld processor-based device. In one preferred embodiment, the ECD is a tablet PC or smart phone device which electrically and/or mechanically couples to a protective receptacle on a boat, for example, that provides on-demand lake maps, location information, tactical "fishing guide" advice and emergency services.

Figure 1:
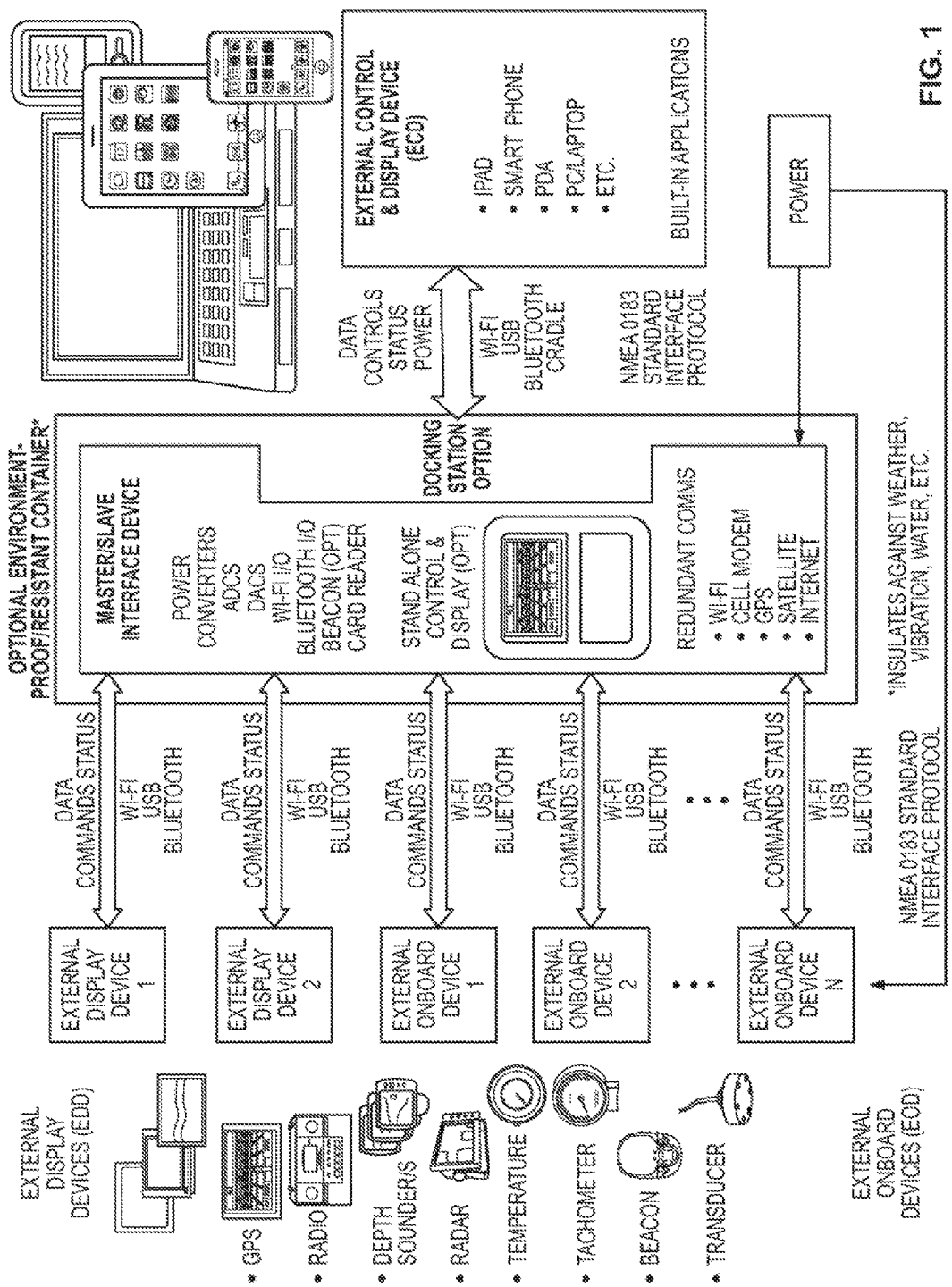
FIG. 1 is a block diagram of an illustrative MSID embodiment.

FIG. 1 is a block diagram of an illustrative MSID embodiment. The system, in certain embodiments, utilizes a previously purchased tablet or smart phone and thus provides all of this functionality with an absolute minimum of investment in new hardware and on a device running an operating system with which the user is already familiar. The protective receptacle provides power and connects to accessory devices via auxiliary network communication systems such as cellular, GPS, Wi-Fi and satellite systems; auxiliary user interfaces such as keypads, touch screens, speakers and headsets; emergency beacons; sensors that detect one or more of air temperature, water temperature, water depth, barometric pressure, change in barometric pressure, wind direction, wind speed; and protective means that render the on-board system substantially weather proof and shock resistant.

However, if an ECD is not present, it may be appropriate in certain embodiments to have a stand-alone device which serves the same basic purpose as the ECD, displaying selected External Onboard Device (EOD) data, which data may originate from a temperature sensor, GPS, or depth sounder, for example. Without an ECD, this data control and display can be independently controlled by built-in control and display functions, or any of the external display devices that are present.

Some remote displays (e.g., in marine applications) allow the user to select and display available vehicular-related data. In some cases, such external display devices (EDD) are all-in-one, stand alone Display/Sonar/GPS/Chart Plotter devices that are quite complex and expensive. In various embodiments, an exemplary Master/Slave Interface Device (MSID) may advantageously enable the same display functionality with less expensive EDDs. The MSID in certain embodiments can enable this with its data routing and device polling capabilities. In an illustrative example, the MSID can read the commands from each and all of the EDDs, interpret these, and send the requested data to each of the remote displays. In this way, complex and expensive remote displays are not needed in such embodiments, yet independent data selection and display is maintained.

In selected embodiments, the MSID is a device which can serve as master or slave to a plurality of external onboard vehicular devices such as depth sounders, GPS, thermometers, etc. These devices optionally include the capability to provide wireless communications to convey control and/or data messages via, for example, Bluetooth or Wi-Fi. In either case, the MSID will have the capability to network with the external onboard devices (EODs) for the purpose of consolidating the considerable amount of data associated with these devices to a user friendly and convenient control and display.

Various embodiments of the MSID can serve as a master control and display, a state in which the MSID selects which EOD data to display, and displays these data on its built-in display. In addition, the MSID may allow an ECD, such as a PDA, iPad, or PC, to act as a master to the aforementioned sensor network. In this state, the MSID acts as a slave to the ECD, merely passing or routing EOD data to the ECD. The MSID may have the capability to automatically sense the presence of an ECD, and allow it to be the master control and display device. This transition may be purely automatic, with the option of a manual input verifying or overriding this decision by the MSID.

The MSID, in an illustrative embodiment, is a dual mode master/slave device that includes an enclosure to securely retain an ECD, and perhaps a plug which electrically couples to the ECD. In some embodiments, the ECD may operate remotely via a wireless connection to the MSID. The MSID unit may include a multi-level power converter to provide, from an external power source such as a vehicle battery for example, appropriate supply voltages to the ECD and, optionally, the EODs. The MSID also includes analog to digital converters (ADCs) and digital to analog converters (DACs) as necessary to enable the MSID to communicate with analog EODs. The MSID further includes wireless communication means such as Zigbee, Bluetooth and Wi-Fi in order to wirelessly couple with external sensors and the ECD, if it is so equipped.

The MSID housing in selected embodiments includes a recess with multiple contoured regions or adjustable/interchangeable mounts to mateably and releasably receive an ECD such as a smart phone or tablet device. The housing optionally includes, for example, water resistant sealing system (e.g., IP rated) to resist the ingress of water, or shock absorbing and dampening features on the housing to insulate the ECD from water, vibration, or weather. The MSID also includes a transceiver to receive user commands from a wireless remote control and transmit the commands to the ECD. Such commands may include user inputs to control various applications running on the ECD such as music players, lake mappers, fish finders/sonar, navigation systems, and the like. The MSID housing may also communicate with an emergency rescue beacon (ERB) (or perhaps a built-in ERB) which automatically generates distress signals in appropriate circumstances based on a command provided from the ECD or MSID.

The system may further include a redundant communication subsystem that takes the form of a Wi-Fi hotspot, a cellular modem with an alternative wireless carrier, a GPS system, and/or a satellite internet connection. This redundant communication system can provide connectivity when a communication means built into the ECD is unable to connect to the network.

In either mode (MSID Master or MSID Slave), the MSID optionally also allow the EDDs to remotely request and display all, or a subset of available data. The MSID will read the requests from each EDD that is present, and send to that EDD, the particular data it requested. In this way, the EDDs can independently display user requested data. This is a capability that may be particularly useful in a watercraft application.

In order for the MSID to accomplish the intended operations, the following set of basic MSID system capabilities pertain. Many of these can be optional depending upon the specific embodiment.

In the absence of an ECD, the MSID system may display available EOD data as selected by the MSID GUI. The MSID may also output commands, as appropriate, to selected EODs. These commands will be selected by the user via the GUI, and will include status requests, data requests, and other EOD specific commands. This will allow the MSID to act as a master control and display device in a standalone capacity (i.e., in the absence of an ECD). In order to accomplish this, the MSID system will accept and perhaps store inputs from the various EOD, which may have a Bluetooth, Wi-Fi (or any other wireless link as needed), or hardwired capability as appropriate. A hardwired capability may be considered as optional on certain models of the MSID.

When an ECD is present, the MSID system may output to the ECD those EOD data selected by the ECD. In this way, the MSID acts as a slave, being a simple data router or pass-through function, enabling the ECD to operate as the master control device for the MSID system and the peripheral EODs. If the ECD is not connected directly to the MSID, the MSID data may be output wirelessly to the ECD via Bluetooth, Wi-Fi, or other pertinent wireless links. Otherwise, the MSDI may output data over the hardwire connection. In order to satisfy this requirement, the MSID will need to accept and perhaps store data from the EODs and the ECD via an optical (e.g., infrared, fiber optic) or wireless link that may be necessary. The MSID will also exchange data with the ECD if it is connected to its docking cradle.

The MSID may supply a standard iPhone/iPad interface cable, including power supply signals, to enable such devices to be cradled into the MSID. This will allow these ECD devices to be mechanically plugged into the MSID, communicate with it, and supply power to it. The MSID may also provide a mechanical receptacle which is compatible with the more popular smart devices that may act as an ECD. In this way, the ECD can be literally plugged into the MSID, which can provide mechanical stability and some degree of environmental protection to the ECD.

The MSID may also supply power to one or more of the EODs, EDDs, as well as ECD as necessary. This could be optional depending upon the implementation.

The MSID may have the option to display any data/information while in the MSID Slave state. This data could simply repeat the data being displayed by the ECD, or include health or status data, for example.

If the MSID has its own built-in display capability, the brightness of this may only need to be the same or brighter than the iPad, for example. An optional user input control (e.g., dial, key, soft key on touch screen) to control the brightness of the display either manually or via automatic brightness control could be provided.

The MSID may be provided with audible outputs as necessary, and depending upon the implementation. Warnings, like an EOD is offline, possibly indicating it has malfunctioned, or its power source died, are some of the options for an audible output. Other operational data could also be output in an audible manner. By way of example, and not limitation, these data could include depth alarms, indicating that a certain preset depth is reached, or a shallow water warning. An option to include different audible outputs for different types of warning may also be included. External speakers may be added for this capability, in addition to accommodating music/video playback operations.

The MSID may also have the capability to report/display system health status. This would be an option that could be included on certain embodiments of the system. A built-in emergency rescue beacon could also be an option depending upon the implementation (e.g., the specific model of the MSID).

Environmental conditions under which the MSID must operate could vary depending upon the specific embodiment. The iPhone operating environment, for example, is given below:

Operating temperature: 32° to 95° F. (0° to 35° C.)
Non-operating temperature: −4° to 113° F. (−20° to 45° C.)
Relative humidity: 5% to 95% noncondensing
Maximum operating altitude: 10,000 feet (3000 m)

The interfaces between the MSID and the EODs, EDDs, and ECDs, could be optional and can range from a hardwire (e.g., USB cable, RS-485, CAN, Ethernet), to optical (infrared), to fiber-optic, and/or any other wireless protocol (e.g., Bluetooth, Wi-Fi, Zigbee). In the case of a hardwire interface, power could also be provided as an option.

The MSID may also provide the option for a backup internal power capability, in case there is a malfunction or interruption in the primary power supply. The amount of time the internal battery backup system lasts would be optional and dependent upon the specific embodiment(s). Various implementations may further include surge suppression circuit elements, for example, to attenuate voltage fluctuations on a vehicular battery or alternator output buses.

The MSID may also act as a data router, sending specifically requested display data to the EDDs. Each of the EDDs will request specific data from the MSID. The MSID in turn will read the requests from each EDD, and then send those specific data to that EDD. In this way, any number of EDDs may be present, and each will be able to independently request and display specific data available from the MSID.

System Architecture

Figure 2:
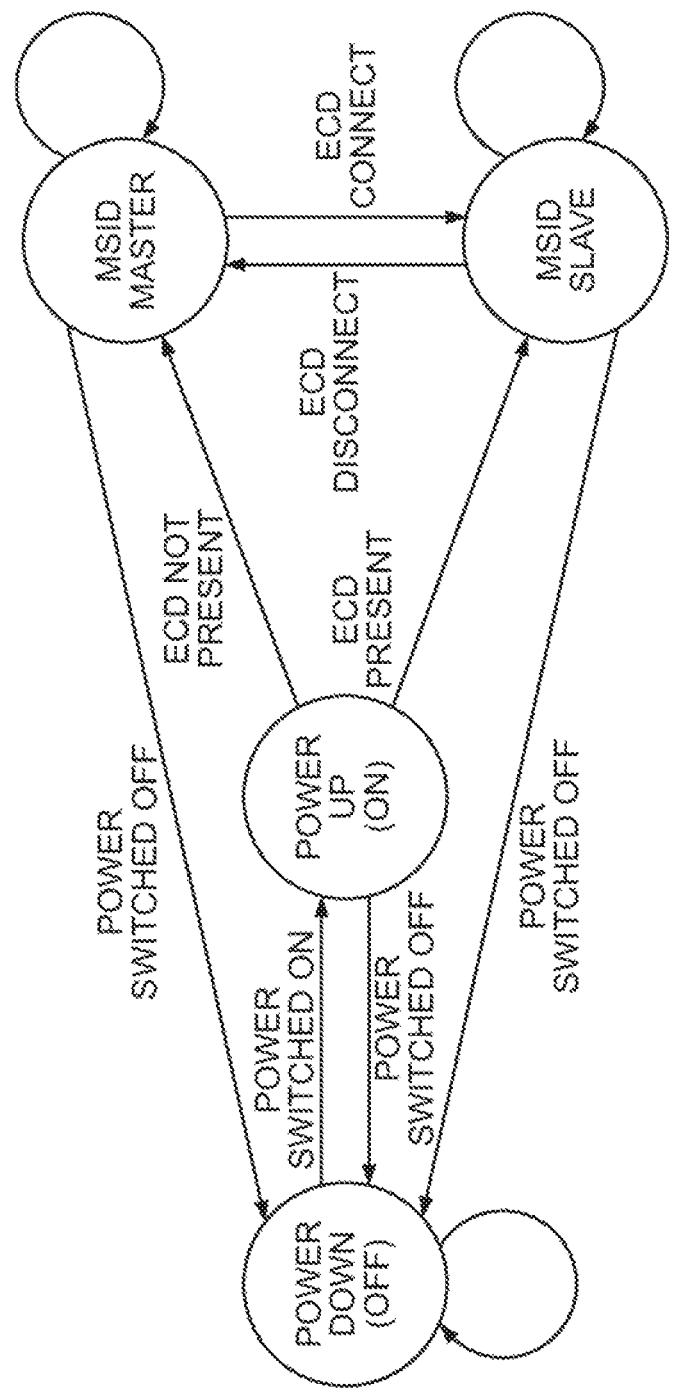
FIG. 2 is a state transition diagram for an illustrative MSID embodiment.

FIG. 2 is a state transition diagram for an illustrative MSID embodiment.

The MSID will operate in any of several states as shown in FIG. 2. This also shows the transition between the states of the MSID along with the transition-enabling event.

The states shown in FIG. 2 are described below:

Power Down (OFF)—The state in which the MSID has no power applied, and no operations are being executed. In this mode, the EODs may or may not be operating autonomously. The only way to transition out of this mode is to power up the system, which can be done by either by connecting power, and/or turning on a power switch. The power down (OFF) state can be transitioned to from any other state by disconnecting power, and/or turning off a power switch.

Power Up (ON)—This is a transitional state in which the MSID has been powered up from the Power Down (OFF) state. This can be accomplished by connecting power and/or turning on a power switch. Since this state is transitional, the system will not stay in this state long, as it will transition either to the MSID Master, or MSID Slave states. It is also possible to transition from this state to the power off state should power be disconnected before the other transitions occur. Other functions which may be performed while in this state include polling of the EODs and local Wi-Fi networks that are within communication range. This would be done to determine what devices are available, and what data might be displayed by the MSID, especially if it ended up in the MSID Master state. This polling could also be used to determine if an ECD is present. In addition, system performance monitoring could be executed to determine the health of the system and its various components.

MSID Master—In this state, the MSID will act as the master. As a master controller, the MSID will have control over the EODs, and control over which EOD data is displayed by the MSID. The MSID will transition into this state in two ways: Upon power up, and no ECD is detected, or while in the MSID Slave mode the ECD is not detected. This would occur for example if the ECD becomes disconnected or runs out of power. In this state, the MSID will maintain control over which EOD data is selected for display onto the MSID built-in display function. A GUI will serve as the control interface between the MSID and user. This can be accomplished via a FOG display (touch screen), or mechanical switches, or a combination of both.

MSID Slave—In this state, the MSID will act as the slave, serving as a mere data router or data pass-through to and from the EODs to the ECD as commanded by the ECD. The MSID will transition into this state in two ways: upon power up and an ECD is detected; or, when in the MSID Master state, an ECD is detected. This allows the ECD to act as the master control and display device for the system. There is an option here to also allow the MSID display to display the same EOD data as the ECD, and/or any number of other data (i.e. status, system health information, etc.).

Note that in either of the MSID Master or MSID Slave state, the EDDs, if present, will be able to independently request and display available data from the MSID.

The operational concept of the MSID is designed to be very simple from a user's standpoint. The MSID provides an inexpensive human-machine interface (HMI) to the plurality of EODs and/or EDDs that might be present on a vehicle such as a watercraft or automobile. Inexpensive in the sense that not only the MSID itself will be cost effective, but the ECD will already be affordable, and probably already purchased by the user. The MSID will allow the user to use his/her ECD as the master control and display device, which will be complete with its own wireless connections, memory, processors, and user-oriented applications.

Figure 3:
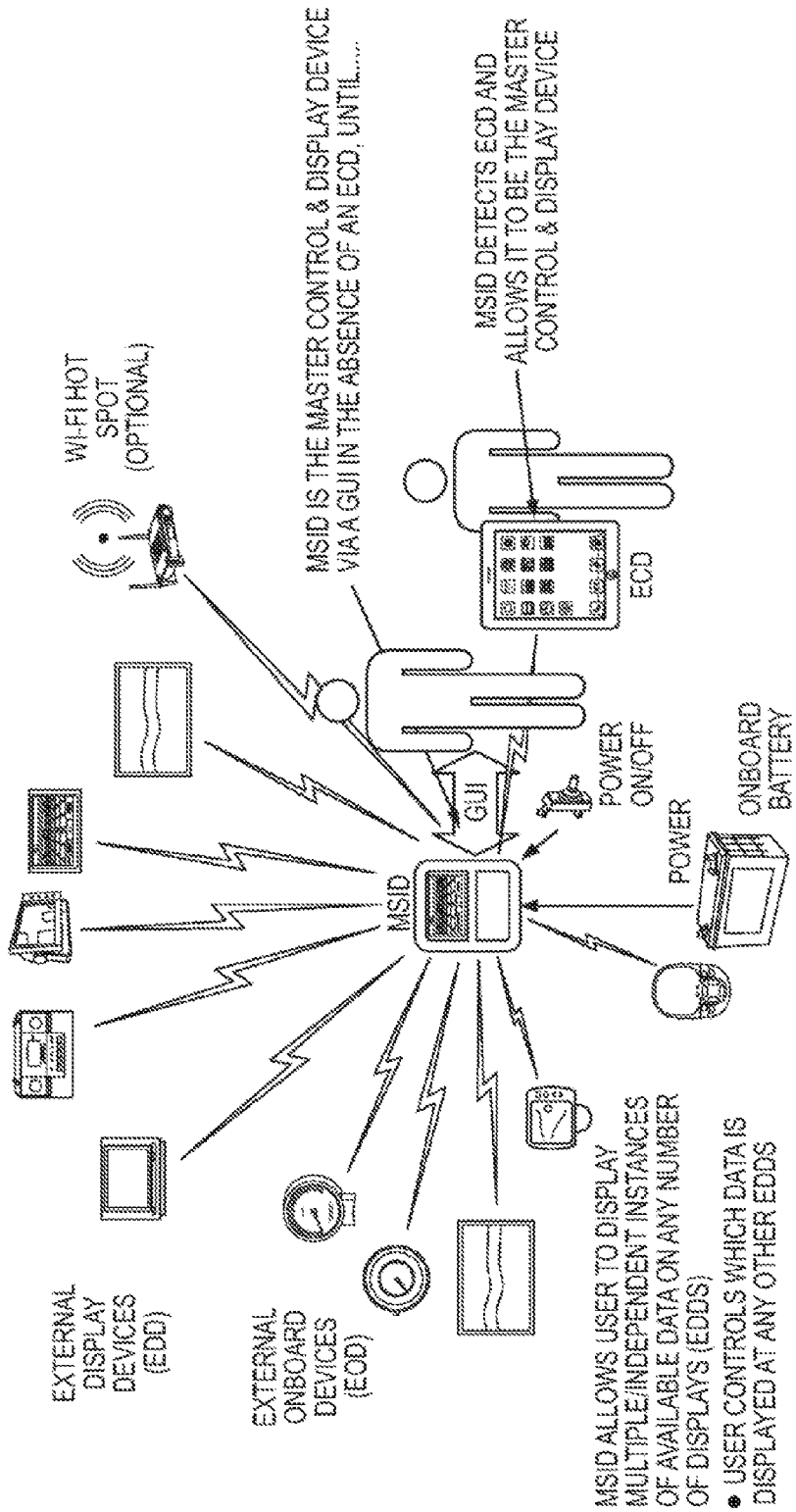
FIG. 3 is an illustration of the basic functionality of an illustrative MSID embodiment.

FIG. 3 is an illustration of the basic functionality of an illustrative MSID embodiment. FIG. 3 illustrates the operational concept of the MSID system. The MSID will operate from the onboard battery power supply. An On/Off switch can be provided to conveniently power up or power down the MSID. An optional built-in battery or the ability to use the battery of the ECD may also be provided as options in the event the vehicular power source fails.

The MSID will interface and accept data from or transmit data to, the plurality of EODs and/or EDDs that are present and operational. The data links between the EODs, EDDs, and the MSID can be either Bluetooth, Wi-Fi, and/or possibly hardwire (such as an RS232 connection).

In various embodiments, the operational concept simplifies the user experience in that the user merely boards the vehicle with or without an ECD.

Figure 4:
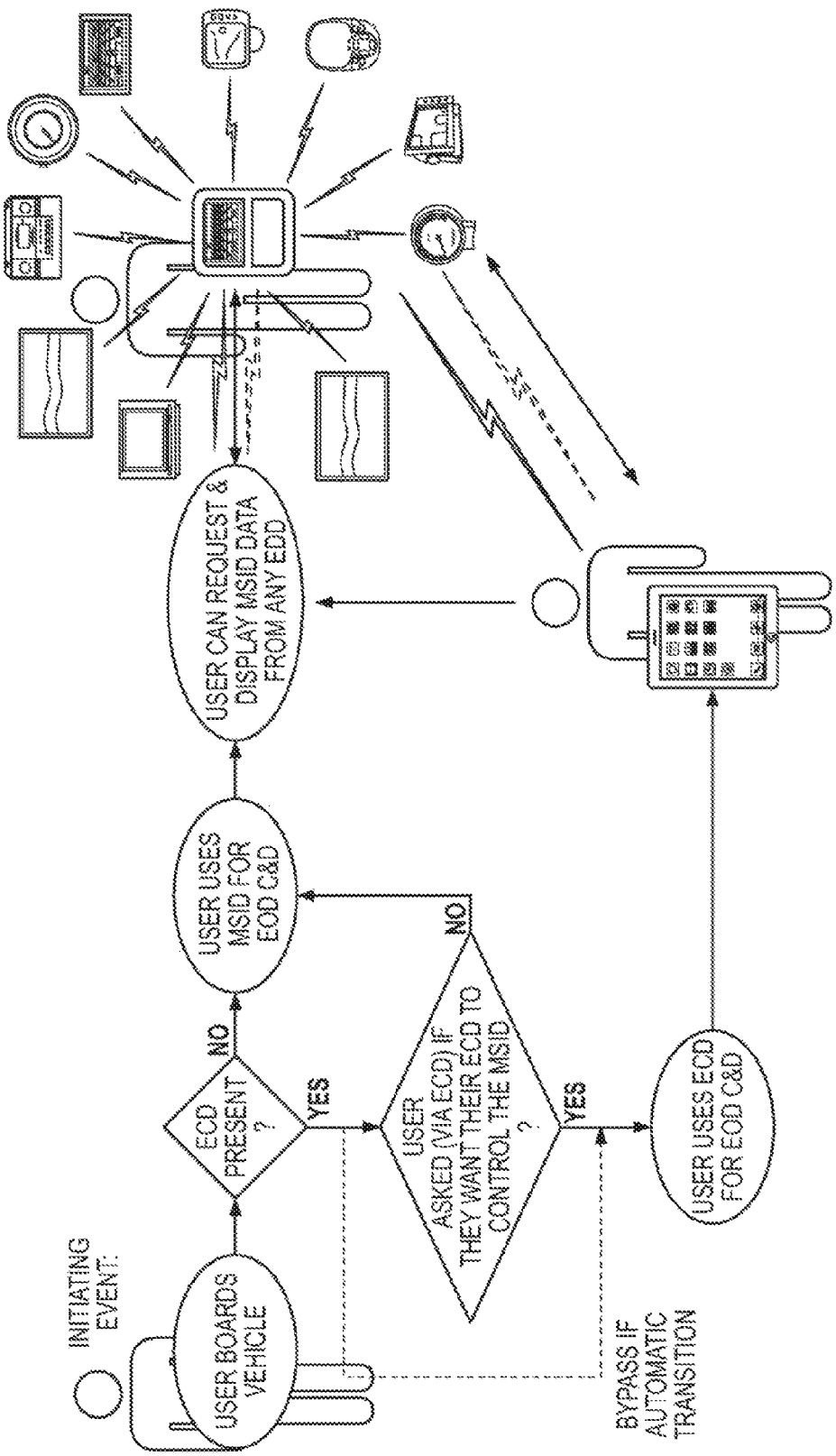
FIG. 4 is an illustration of the basic functionality of an illustrative MSID embodiment from a user perspective.

FIG. 4 is an illustration of the basic functionality of an illustrative MSID embodiment from a user perspective. As shown in FIG. 4, once the user boards the vehicle and an ECD is not brought on board, the MSID will not detect it, and will continue operating in whatever state it is in. The user simply uses the MSID directly to control and display EOD data (e.g., the MSID is the master control and display device).

If the user does have an ECD, the MSID will detect it (assuming it is powered on), and may provide the user the option to make it the master. The user acknowledges this, and proceeds to use their ECD as the control and display for the ECD data (e.g., the MSID is the slave). If the user decides not to use the ECD as the master, then the MSID will continue to act as master. This can be made automatic if desired, in the sense that if an appropriate ECD is detected, the MSID automatically transitions into the slave state, giving master control over to the ECD. In either case, the user interaction is keep to a minimum.

The MSID may also advantageously enable relatively inexpensive EDDs to be used for data display, rather than the more expensive all-in-one, stand alone Display/Sonar/GPS/Chart Plotter devices that are already available and commonly used. The MSID does this by reading the requests from each EDD present, and then sending the requested data to the EDD that requested the data. The MSID will have this capability in either the Master or Slave state. This is shown in FIG. 4.

The generic embodiment of the MSID system is decomposed into the following subsystems:
1. Platform Subsystem (PFSS)
2. Transceiver Subsystem (TRSS)
3. Control and Display Subsystem (CDSS)
4. Digital Processing Subsystem (DPSS)
5. Clock Distribution Subsystem (CLSS)
6. Power Distribution Subsystem (PDSS)

Figure 5:
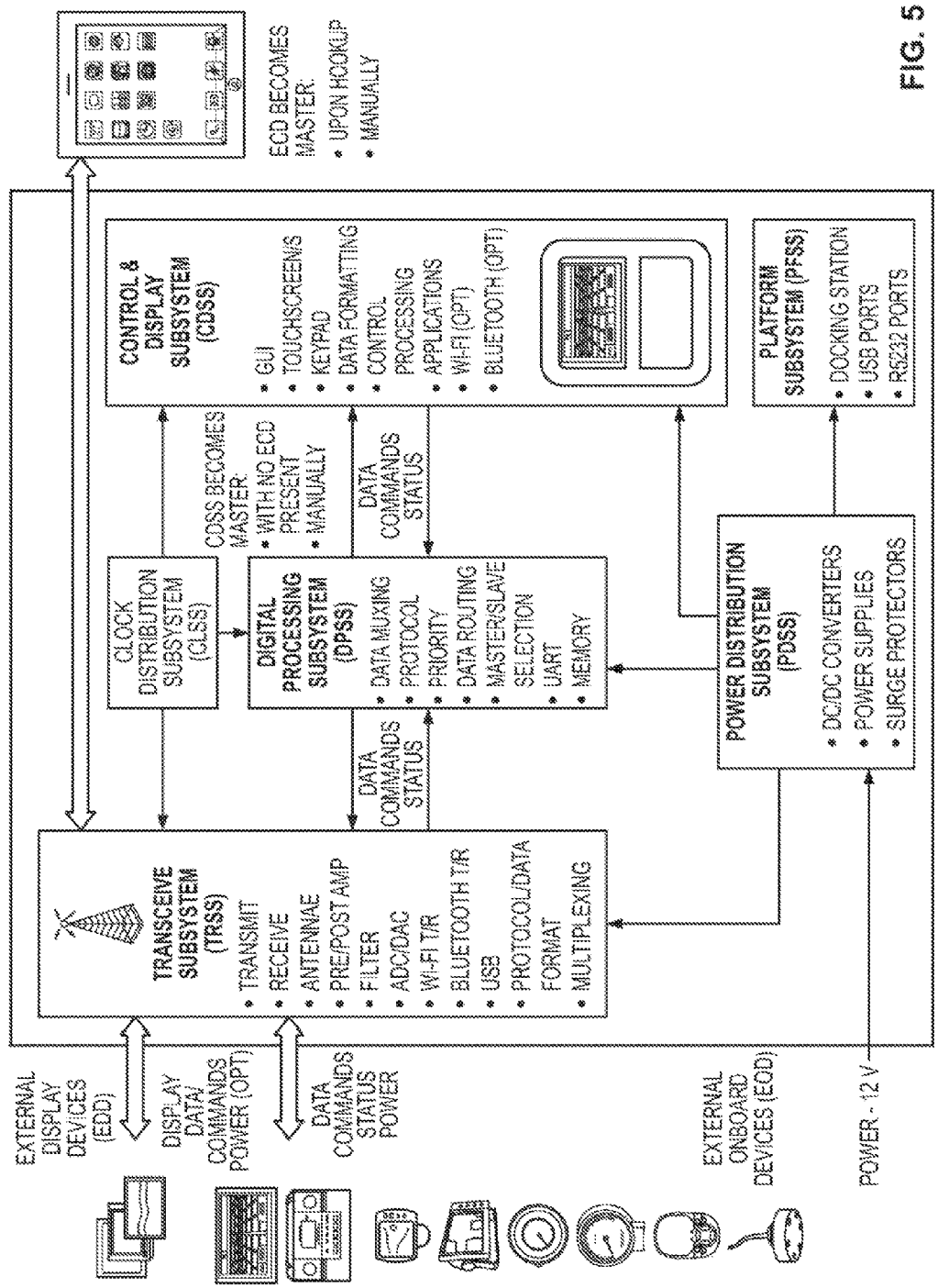
FIG. 5 is a subsystem block diagram for an illustrative MSID embodiment.

A block diagram of these subsystems is shown in FIG. 5, followed by a description of each. FIG. 5 is a subsystem block diagram for an illustrative MSID embodiment.

The Platform Subsystem (PFSS) is the primary mechanical interface between the EODs, EDDs, and the ECD. It therefore contains any hardwired interfaces such as an RS232 interface with the EODs, EDDs, or ECD if necessary. This may be necessary if the option to provide power to the external devices is invoked. The PFSS provides the structure which houses all of the other subsystems, including a docking cradle for the ECD. It may also contain a display of its own (part of the CDSS) to act as a master control and display when in the MSID Master state.

The Transceiver Subsystem (TRSS) provides all the communication between the MSID and the EODs, EDDs, and any ECD that may be present. As such, it may include wired or wireless interfaces (e.g., for Bluetooth, Wi-Fi, and/or any hardwired interfaces) that may be necessary. It will also provide the ADCs necessary to convert the incoming analog signals to digital for processing by the DPSS. It will subsequently also contain any DACs necessary to convert and digital signals to analog for transmission. Most of these conversions however will take place within the Bluetooth and/or Wi-Fi transceivers which will probably be contained within the TRSS.

In an illustrative example, Wi-Fi may be primarily used for connecting wirelessly to the internet, and Bluetooth may be primarily a shorter range wireless interface to remote, but nearby devices, it is anticipated that, in some implementations, Bluetooth will primarily be used for these EODs and/or properly equipped EDDs, as well as interfacing to the ECD, whereas Wi-Fi may be used for any wide area network (e.g., internet) connections with the MSID.

The TRSS may send data to, and receive data from the DPSS. Properly formatted EOD and/or EDD data will be transmitted to the DPSS, possibly along with EOD status. In return, the TRSS will receive commands from the DPSS to be transmitted to the EOD. Such signals may include a beacon command for example.

The TRSS may also receive a clock from the CDSS if necessary. Since most wireless communication protocols are asynchronous, it is not anticipated that this interface will be necessary, but it included for completeness.

The Control and Display Subsystem (CDSS) may be the primary interface between the MSID and the user when in the MSID Master state. In order to keep costs down, the capability of this standalone mode may not be as sophisticated as a modern ECD such as an iPad, but it will contain the basic capability to control and display the EOD and EDD data. One embodiment could be a touch screen, similar to those found on many ECDs or EDDs. The control could be via finger on glass (FOG) commands on this display.

The CDSS will receive EOD/EDD data from the DPSS. This could already be formatted for display, or if not, the CDSS would perform any formatting that may be required. This interface may be implemented by hardwiring to the DPSS.

Figure 6:
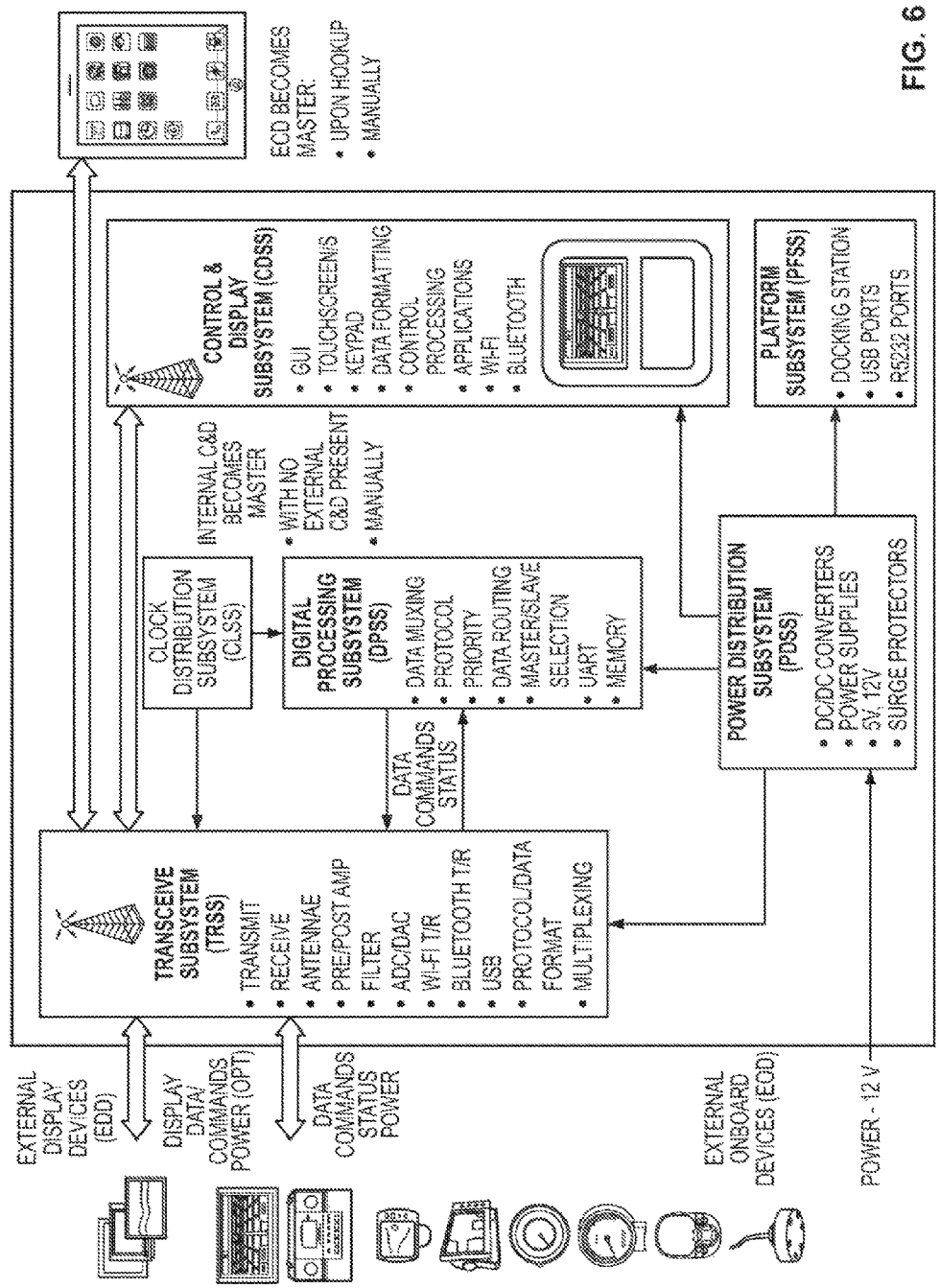
FIG. 6 is another subsystem block diagram for an illustrative MSID embodiment.

FIG. 6 is another subsystem block diagram for an illustrative MSID embodiment.

In the example shown in FIG. 6, EOD/EDD data transfers data directly from the TRSS via wireless link, such as a Bluetooth or Wi-Fi. In the latter case, a Bluetooth or Wi-Fi capability will be a necessary component in the CDSS.

Figure 7:
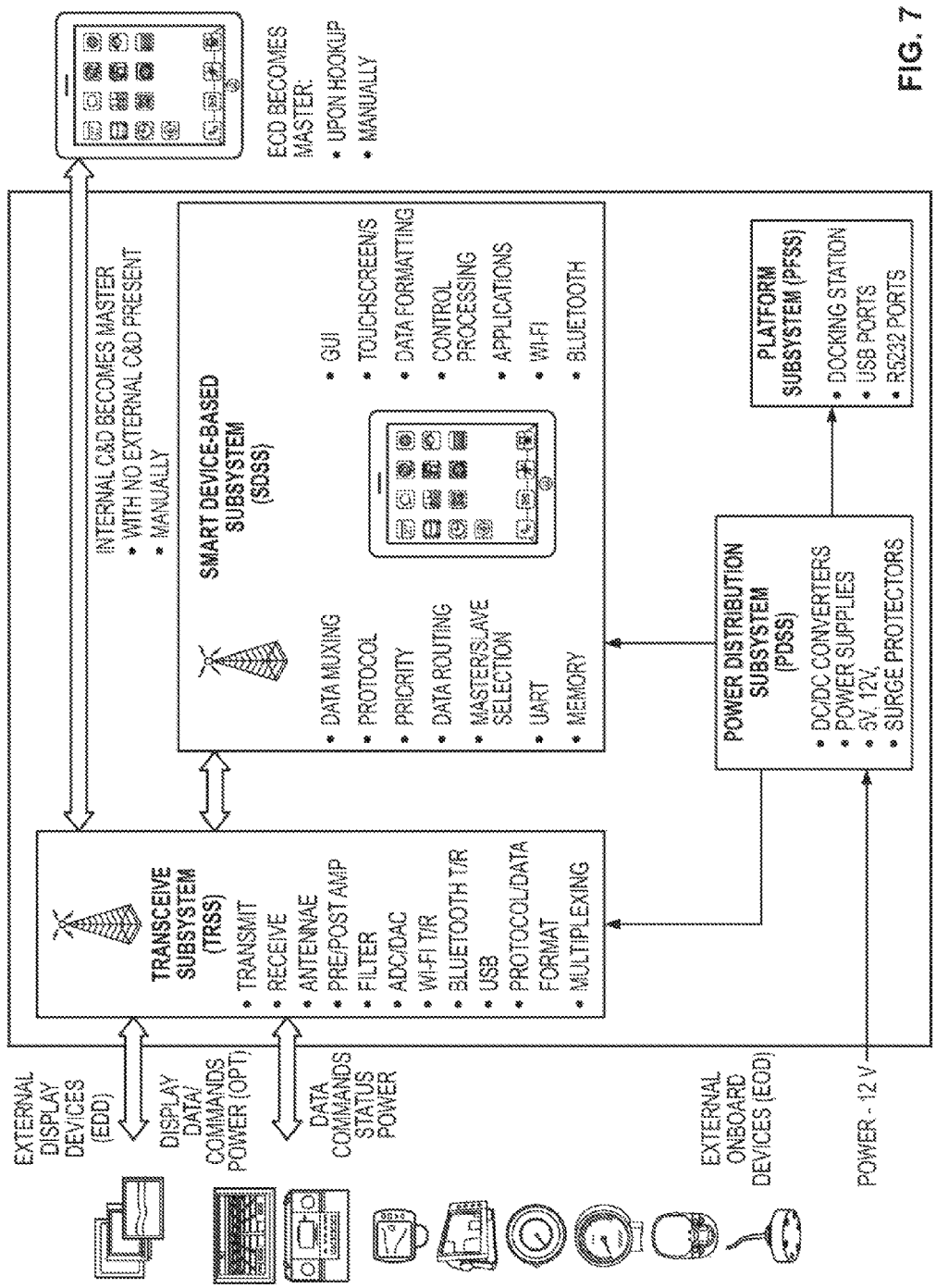
FIG. 7 is yet another subsystem block diagram for an illustrative MSID embodiment.

FIG. 7 is yet another subsystem block diagram for an illustrative MSID embodiment. In this example, the DPSS could be an already available device such as an iPad or iPhone, depicted in the figure as a Smart Device-Based Subsystem (SDSS). These devices already have Wi-Fi, Bluetooth, hardwire communication capability embedded in them, in addition to digital processors and user-oriented applications. This could act as the CDSS, CLSS and DPSS. This may be accomplished, for example, by communicating with the TRSS directly via a wireless link. FIG. 7 shows this optional implementation.

The Digital Processing Subsystem (DPSS) provides the processing necessary for the detection and decision logic that will determine if the MSID transitions into the Master or Slave state upon power up. These decisions are illustrated in the processing flow diagram of FIG. 9.

In order to make these decisions, the DPSS interfaces with both the TRSS and CDSS. In the slave state, the DPSS serves mainly as a data router or data pass-through function, transferring data to and from the TRSS as commanded by the ECD and/or EDDs.

When in the MSID master state, the DPSS receives commands from the CDSS and passes them to the TRSS. The EODs will receive these commands, and send back the requested data to the TRSS. The DPSS will pass the received data from the TRSS to the CDSS for subsequent display.

In either state, the MSID will also accept display data requests from each EDD present, and route the requested data, if available, to the appropriate EDD.

In an exemplary embodiment, one or more dedicated and/or general purpose computer chips may be used to implement the DPSS. As such, it may need an external clock. If this is necessary, the Clock Distribution Subsystem (CLSS) generates whatever clocks may be needed by the DPSS, or any other subsystem, and distributes them as necessary. Although some point-to-point communications, especially wireless, are asynchronous and may not need externally generated clocks at all, the CLSS may be included for various implementations.

In various embodiments, the Power Distribution Subsystem (PDSS) may use as its primary source of power an external source, such as a vehicular 12 Volt battery, for example. It may then provide the necessary power conversion, most likely DC to DC in nature, to the various other subsystem components, as well as possibly the EODs, EDDs, and/or ECDs. Typical devices in applications such as this could require voltages of 5 Volt for devices like the iPhone, iPad, and iPod for example. Other voltages may be generated as required by the specific embodiments.

Interfaces

Figure 8:
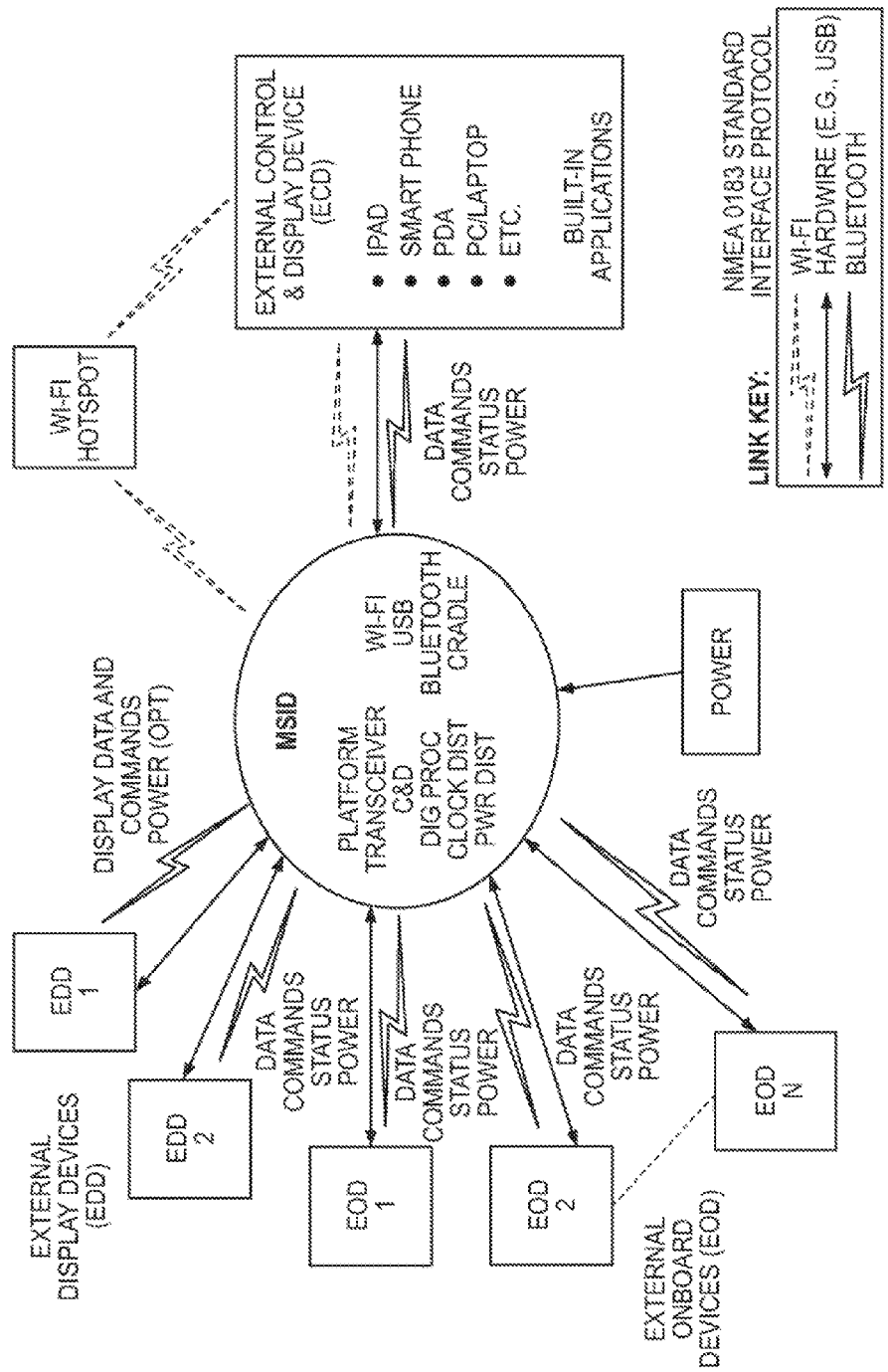
FIG. 8 is an interface diagram for an illustrative MSID embodiment.

Interfaces to the MSID are shown in FIG. 8, and include wireless links, like Bluetooth and Wi-Fi, as well as hardwire links (as necessary). The hardwired interfaces may be optional, and not provided on some models of the MSID. In all probability, the EODs and EDDs will be in close proximity to the MSID. Since Bluetooth wireless communications are inherently short range, it is this wireless link that will primarily be used between the MSID and EODs as well as appropriately configured EDDs. Bluetooth will also be one of the means to communicate with the ECD as well. This is shown in the figure. The ECD may also contain a Wi-Fi transceiver, so this type of link could also be used for MSID-ECD communications, as well as a hardwire link. To link with a Wi-Fi hot spot for internet connectivity, Wi-Fi may be utilized exclusively. A common protocol for wireless links is the NMEA 0183 Standard. The NMEA 0183 Standard defines an electrical interface and data protocol for communications between marine instrumentation, so this could be the primary protocol used for the MSID. Other protocols exist, and will be used depending upon the specific implementation of the MSID.

Figure 9:
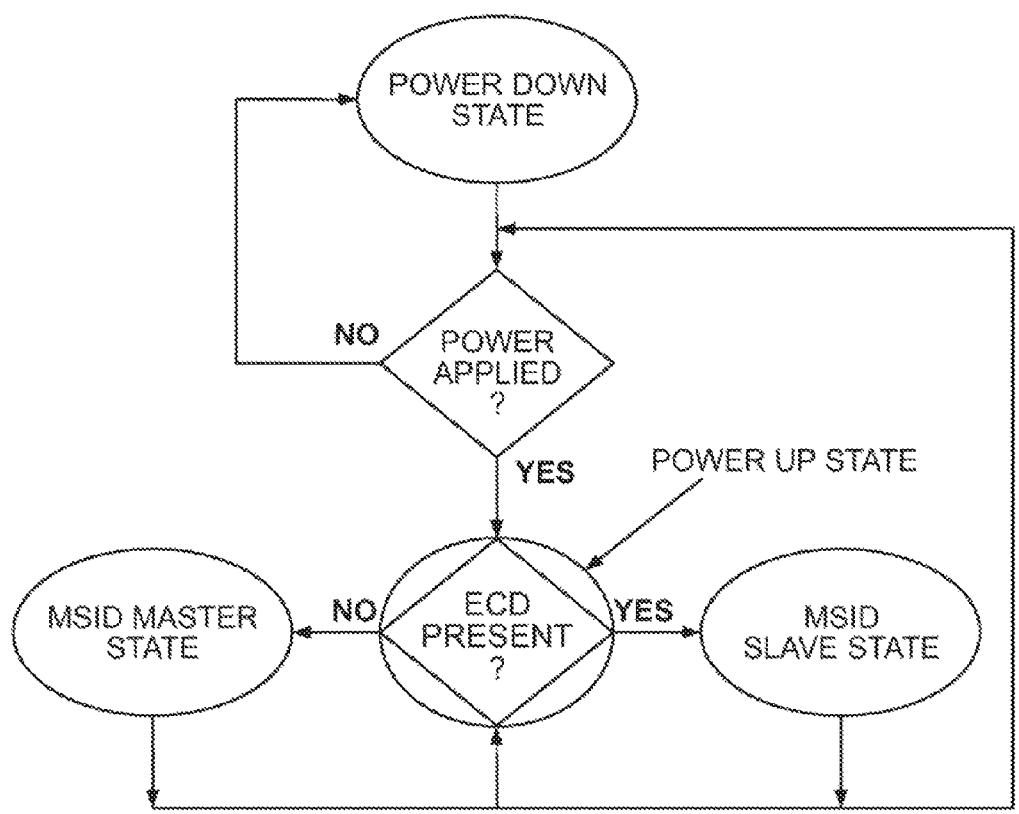
FIG. 9 is a process flow diagram for an illustrative MSID embodiment.

FIG. 9 is a process flow diagram for an illustrative MSID embodiment. FIG. 9 depicts the basic processing flow diagram as the MSID system transitions from the Power Down (OFF) state to either the MSID Master or MSID Slave state, via the transitional Power Up (ON) state. It also demonstrates the transition from any active state to the Power Down state, mainly by removing power. The DPSS is primarily responsible for this particular decision process.

As with the state transition diagram (FIG. 2), this process embodies one of the essential innovative aspects of the MSID. A more detailed process is shown in FIG. 10, which simply shows more of the operations that would be involved when the MSID is in its various states.

Figure 10:
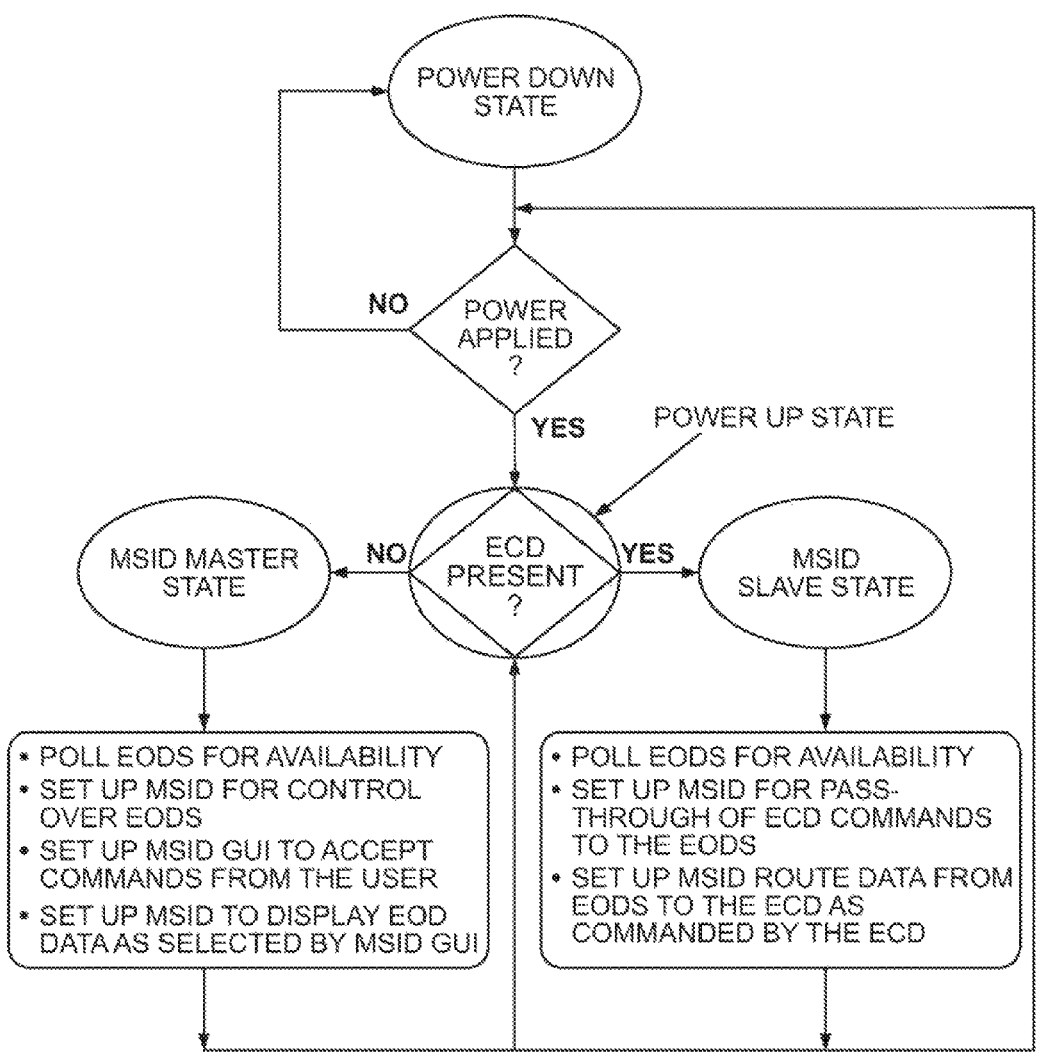
FIG. 10 is another process flow diagram for an illustrative MSID embodiment.

FIG. 10 is another process flow diagram for an illustrative MSID embodiment. For example, in the MSID Master state, the MSID will poll the available EODs, and set itself up as the control over them. It will also set itself up to display EOD and EDD data as selected by the MSID GUI, or as selected by the individual EDDs that are present.

In the MSID Slave state, the MSID may also poll the available EODs, but in this case it may set itself up to receive ECD commands, and serve as a data router, transferring EOD data as selected by the ECD, to the ECD for display. The MSID need not itself be the source of the commands, nor will it need to display the selected EOD data. An option is to let the MSID go ahead and also display the selected EOD data, as well as sending the data to the ECD. As with the MSID Master state, the MSID in the Slave state may continue to accept display data requested by each of the EDDs, and route those data to the appropriate EDDs.

Master/Slave Mode Functionality

Figure 11:
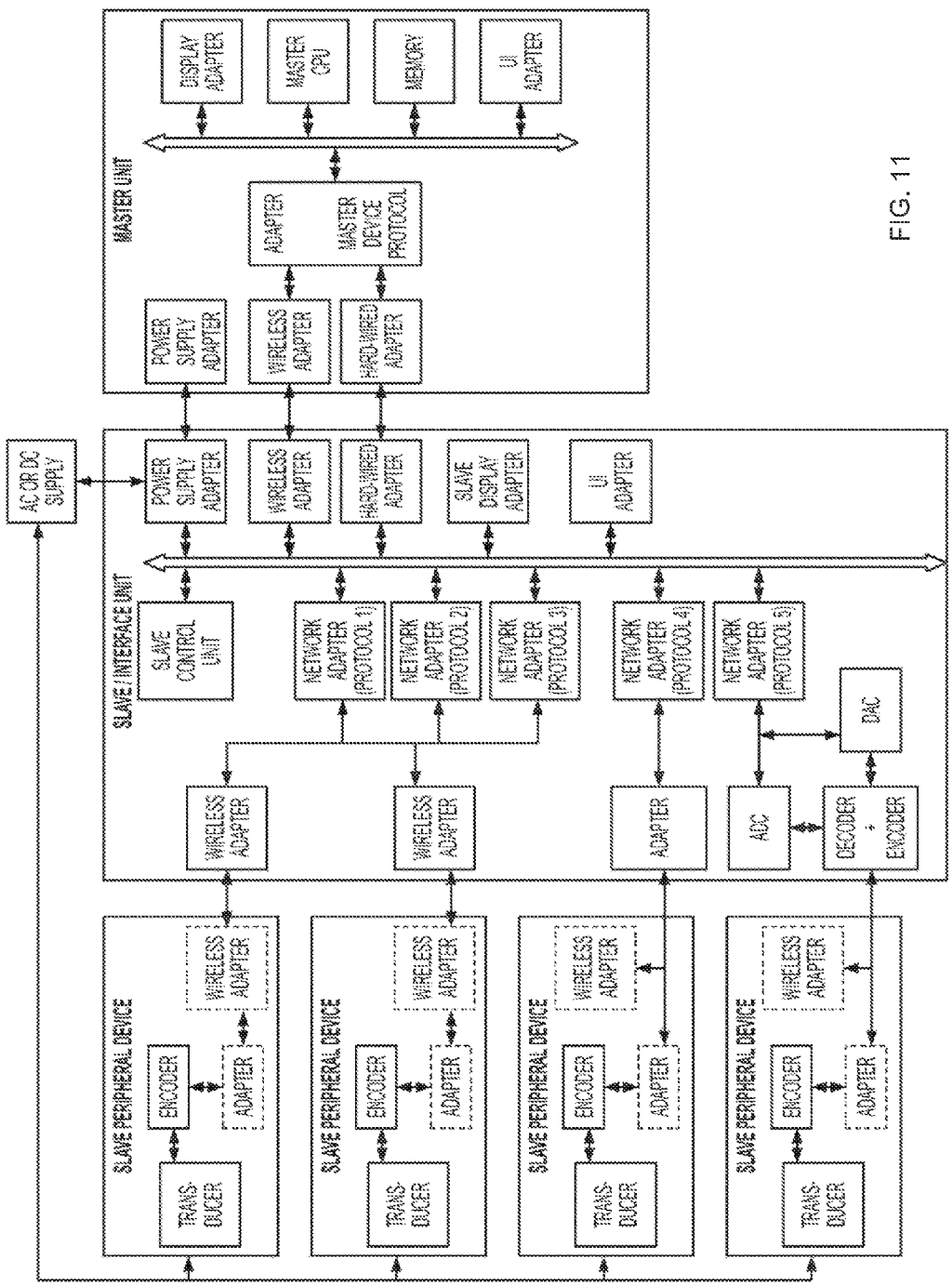
FIG. 11 is a schematic of a hardware-centric system architecture.

FIG. 11 is a schematic of a hardware-centric system architecture.

A hardware-centric implementation is illustrated in FIG. 11. It will be understood that the functions of the controllers and adapters may optionally be performed in software, either within the operating system, drivers or in the application layer. It will also be understood that the architecture of FIG. 11 can be arbitrarily expanded by inclusion of more peripherals, controllers, adapters, converters, control units, processors, buses, encoders, decoders, etc. and that the functionality of an arbitrary fraction of those additional components can likewise be deployed in software executed by a general purpose microprocessor. The items in dashed boxes are optional in the depicted embodiment.

With reference to the example of FIG. 11, a master unit (e.g. handheld device) interfaces with a slave/interface unit (e.g., an MSID) which in turn interfaces with a slave peripheral device (e.g., vehicular subsystem controllers, sensors, transducers). The slave/interface unit includes various network protocol adapters which are configured to communicate unidirectionally or bidirectionally with the peripheral devices. The slave control unit (processor) arbitrates the communication between the network protocol adapters and the handheld device adapters. The master unit bus operates on a master device protocol and communicates according to the protocol with the adapters which are interfaced with the slave/interface unit.

Accordingly, the master unit communicates unidirectionally or bidirectionally with the slave peripheral devices directly or pseudo-directly in the sense that the slave/interface control unit is in one embodiment merely arbitrating the transmission of data through the slave/interface unit. In other embodiments the slave control unit or an operating system or application program running thereon serves as a peripheral with a ported connection to the operating system of the master unit and thereby serves as a translator or intermediary between the master unit and the slave peripheral devices. In preferred embodiments the functionality of the slave control unit is minimized in order to permit the use of inexpensive processors and memory. In such embodiments the slave control unit does not execute processor overhead intensive or memory-access-intensive tasks but rather arbitrates the communications with the master controller.

In certain embodiments the slave control unit retains control of certain interface operations with the slave peripheral devices. Fault detection, polling, clocking (if required) and related operations may be performed in the background by the slave control unit. The master control unit remains, in some examples, the sole or primary user interface. The master unit may provide, from the user's perspective, the main control panel for all vehicular operations associated with the peripheral devices.

To this end, the master device optionally includes an application program or array of application programs which utilize data received from the various slave peripheral devices. In one embodiment, a single application program includes various modules accessible through a single user interface screen. Each module performs a different category of functions. For instance, a mapping and navigation module interfaces with the GPS or location service related peripheral devices, displays a navigation map and enables route guidance and direction services. A fishing guide program interfaces with GPS or location based peripherals, sensor peripherals (depth and water temperature) and remote servers (fishing guide advice server, weather conditions server). Entertainment modules interface with associated peripherals, such as speakers and audio input sources.

Access with remote servers in preferred embodiments is controlled by the master unit operating system. If the master unit is equipped with communication means that permit an internet or private network connection the master unit operating system arbitrates and controls the access of remote servers as required by the application programs. Alternatively, the slave control unit operating system may act as a communications peripheral by controlling a subordinate communication means included in the slave/interface unit.

In this way, the operating system and application program (s) on the master unit in a preferred embodiment act to provide the primary user interfaces and network connections relied upon to support the application level functionality. Access to remote servers to obtain directions, lake maps, software updates and downloads, subscription based services, telephony, email, messaging, streaming media and the like is managed by the master unit operating system and application programs.

Updates in such embodiments may be executed conveniently by polling and download operations managed by the master unit's operating system and application programs. Additional and new software may likewise be downloaded at any time an appropriate network connection is established by the master unit. Subscription based services may likewise by utilized (and enrolled in) when the master unit is mated to the slave/interface unit and optionally when it is not.

According to this embodiment, if the user upgrades his or her handheld computing device the functionality of the MSID system will likewise be enhanced. The software and settings from the user's previous handheld device may be ported over to the new device and new functionality may be provided by the new master unit operating system and/or new application software downloaded to the master unit.

In various embodiments a master unit application also manages the updating and installation of software on the slave/interface unit. Periodic updates and new operating system and application program versions may be downloaded by and to the master unit and then installed on the slave/interface device.

The slave/interface unit may include an arbitrary amount of the functionality of the master unit, including redundant applications to permit similar control operations when the master unit is absent. It should be understood that in many embodiments provides the substantial advantage that the slave/interface unit hardware and software will be relatively rudimentary and cost-effective because the system will be primarily intended operate in slave mode, mated to a user's handheld device. For instance, the slave/unit interface processor speed (including clock speed) may be substantially lower than that of the handheld device. Likewise, the main rapid access memory of the interface unit may have a substantially slower access speed and read/write rate than that of the handheld device. The slave/unit interface may be equipped with a relatively inexpensive hard disk drive and the handheld device may be equipped with comparatively expensive nonvolatile memory as a main storage means.

The slave/interface unit and master unit may communicate according to a client/server model, the master being the server. The master unit may likewise communicate with remote servers according to a client/server model, the master unit being the client in that communication. The operating system on the MSID, as discussed above, is configured to enter a slave mode upon the insertion of a handheld device into a docking cradle or mating of a handheld device to the MSID. The MSID may also have various software applications which interface with one or more vehicular subsystems. These programs include depth charting software, GPS location software, lake mapping software, navigation software, trolling motor control software, messaging software, and emergency rescue beacon control software.

Housings

Although various embodiments have been described with reference to the figures, other embodiments are possible. For example, the functionality of a stand-alone GPS (e.g., the EDD as depicted in FIG. 1) may be provided directly by the MSID coupled to an appropriate antenna. In some examples, the antenna may be provided by a mobile cellular device with pre-existing GPS functionality that may be communicated to the MSID. In some implementations, an antenna and appropriate receiver systems (e.g., without a dedicated screen, software, and graphical user interface) may provide the requisite RF capability to determine location using software executed on the MSID, for example. Such embodiments may achieve reduced complexity and may reduce overall system cost and flexibility while reducing redundant subsystems and while providing the user with a familiar user interface via the MSID, for example. Such centralization of functionality in the MSID may, in some examples, promote flexibility in system implementation, allowing the user more choice in selecting quality and types of subsystem components for the application.

In an illustrative example, an exemplary system may be implemented on a boat such as may be used for fishing. The system may be operably coupled to communicate data, commands, and/or status to a propulsion system and/or a steering system. In some implementations, the propulsion and steering may be electronically controlled, such as commercially available, for example, as the Minn Kota Terrova™ trolling motors sold by Thorne Bros. of Minnesota. As bow mounted motors, the MIDS may operate in slave or master modes to provide steering information to the motor based on position information, which may be generated directly by the MSID via an antenna interface, or received from a stand-alone EOD with GPS capability in response to a request for location packet transmitted from the MSID.

In an example, the MSID may be programmed in real time to learn a track of positions and times (or speeds) that can be stored in a memory in the MIDS or ECD as the track is being physically followed by the boat (e.g., could be any other type of vehicle). Offline, tracks may also be programmed into the MIDS or ECD by users or downloaded or generated as a suggestion by a computer running specialized software, for example. Such programmed tracks may be intended to guide the boat under the steering and propulsion of the bow mounted motor, under the control of the MSID and/or the ECD via the MSID. In an illustrative example, one or more computer generated (suggested) tracks may be designed to guide the boat to specific locations based upon depth chart information, and may further control propulsion to optimize trolling depending the predetermined depth information, and to optimize speeds when transitioning between trolling regions (e.g., when moving to different spots). The tracks may be automatically adapted based on the time of day and temperature, in accordance with user's predetermined input criteria.

As an example, a suggested track at an unfamiliar lake may be auto-suggested by specialized software according to user's predetermined criteria and to depth information downloaded onto a tablet computer. The user carries the tablet computer with the auto-suggested track information onto a fishing boat. Upon coming into Bluetooth range of the boat, the MSID establishes a link with the tablet computer acting as the master device. The user inserts the tablet computer into a splash resistant protective housing that is sealed against ingress of water to protect the tablet. The housing has an aperture to permit user access to the touch screen. The user runs an app that, when executed, causes the trolling motor to propel and steer the boat efficiently to initiate the predetermined auto-suggested track. The tablet computer (ECD) communicates with various EODs and EDDs via the MSID. For example, the depth profile and track and temperature information may be received from appropriate transducers and GPS devices acting as EODs, and then displayed at various positions on small personal EDDs to each of the users on the boat. The depth, track, and temperature display information assembled by the ECD is distributed to the EDDs to keep each fisher on the boat informed as to current conditions and potential opportunities. If the conditions change, such as temperature falling out of a predetermined, user-defined threshold range, the ECD may automatically determine or suggest to advance the track to a second area or depth range, according to predetermined user-input criteria.

In various embodiments, the user may pre-program a large number of tracks into the tablet computer while away from the boat and remote from the MSID. The user may also define criteria based on characteristics of selected species of fish, and associate tracks with the criteria. For example, walleye may have different depth/temperature/calendar/time of day criteria for auto-suggested tracks compared to criteria for small mouth bass, for example.

In addition to providing communication via the MSID to propulsion and steering, the system may, in various embodiments, be configured to communication data, control and/or status information, either unidirectionally or bidirectionally, with other vehicle-based instruments or systems. For example, the ECD may receive engine information (e.g., oil temperatures, fuel level, battery level, system status), monitor miles per gallon of fuel (or equivalent units), hours of operation, and maintenance schedules, for example.

As described in U.S. patent application Ser. No. 61/623, 222, entitled Interfacing Handheld Devices, and 61/621,495, entitled PhoneBook and TabletBook, which are incorporated herein by reference, the handheld device may be installed in a variety of housings. In one embodiment, the slave/interface unit (MSID) includes a clamshell housing to retain and protect the handheld master unit. The clamshell is optionally substantially waterproof or water resistant, at least when in the closed state. The clamshell may also include rubber mounts, springs and/or viscous mounts or dampers which substantially absorb vehicular vibration. Tactile keypads may be omitted in maritime and automotive embodiments. In such embodiments, the MSID may include essentially the upper half of the TabletBook clamshell device with an optional hinged cover (not shown) to provide water resistance.

MSID Memory Card Option

The MSID may optionally be equipped with a memory card slot and associated adapter. In this embodiment SD cards containing proprietary information such as lake maps can be inserted into the MSID and accessed by the MSID when it is in master mode and by the handheld device (through the MSID) when the MSID is in slave mode. In this manner proprietary content such as lake maps, fish guide advice, contour maps, navigational data can be purchased in the form of a card as an alternative to downloading that information through the handheld device or transceivers associated with the MSID.

Some implementations may realize another cost benefit in the ability to add the MSID to existing peripherals and sensors (transducers, antennas, temp senders, speakers, displays, radar's . . . "off the shelf components") in a system already installed in a vessel or vehicle reducing the cost to retro fit a vehicle with a non-functional or outdated stand-alone/traditional system.

Some embodiments may achieve additional benefits in the ability to receive streaming media (audio and/or video and/or data) on one display, for example, on half of a split screen style display while monitoring depth, GPS, radar or any other of the system's sensors on the other half of the same display. For example, streaming media may be displayed on a completely different display at the same time. In marine applications, for example, some embodiments may provide the ability to download from the internet while routing data to local devices over a network.

A number of embodiments have been described. Nevertheless, it will be understood that various modifications are optionally made without departing from the spirit and scope of this disclosure. Accordingly, other embodiments are within the scope of the following claims.

What is claimed is:

1. A vehicular computer interface system, comprising:
   a dual-mode controller disposed in a vehicular fixture, the controller including a processor, a main memory and a display; and
   a plurality of vehicular peripheral devices coupled to and in bi-directional communication with the dual-mode controller, said peripheral devices including engine control subsystems, media controllers, navigation systems, sensors and transducers;
   wherein the dual-mode controller is operative to switch between a master mode and slave mode responsive to the occurrence of both i) the detection of a user's personal handheld computing device, and ii) receipt of a command from a user to enter the slave mode,
   wherein, when in the master mode, the dual-mode controller serves as the user's exclusive interface with the vehicular peripheral devices, and
   wherein, when in the slave mode, the dual-mode controller allows the user's personal handheld computing device to be a master controller for one or more of the plurality of vehicular peripheral devices and to serve as the user's exclusive interface with the one or more of the plurality of vehicular peripheral devices, whereby the user's control of certain of the plurality of vehicular peripheral devices is enhanced by the user's familiarity with an operating system of the user's personal handheld computing device.

2. The system of claim 1, wherein dual mode controller is configured to make a ported connection to an operating system of the user's personal handheld computing device.

3. The system of claim 1, wherein when in slave mode the dual-mode controller allows the user to interface with the one or more of the plurality of vehicular peripheral devices via a human-machine interface of the user's personal handheld computing device.

4. The system of claim 1, wherein when in slave mode the dual-mode controller retains control of certain interface operations with the plurality of vehicular peripheral devices.

5. The system of claim 1, wherein a processing speed of the dual-mode controller is substantially lower than a processing speed of the user's personal handheld computing device, whereby the dual-mode controller is adapted for low-cost manufacture.

6. The system of claim 5, wherein a main memory access speed of the dual-mode controller is substantially lower than a main memory access speed of the user's personal handheld computing device, whereby the dual-mode controller is further adapted for low-cost manufacture.

7. The system of claim 1, wherein when in slave mode the dual-mode controller serves as a data router between the user's personal handheld computing device and the one or more of the plurality of vehicular peripheral devices.

8. The system of claim 1, wherein when in slave mode the dual-mode controller serves as a protocol translator, whereby the user's personal handheld computing device is enabled to communicate with the certain of the plurality of vehicular peripheral devices.

9. The system of claim 1, wherein the dual-mode controller includes a plurality of network protocol adapters each of which is configured to communicate unidirectionally or bidirectionally with at least one of the vehicular peripheral devices.

10. The system of claim 1, wherein the dual-mode controller arbitrates the transmission of data between the user's personal handheld computing device and the certain of the plurality of vehicular peripheral devices.

11. A vehicular computer interface system, comprising:
    a dual-mode controller disposed in a vehicular fixture, the controller including a processor, a main memory and a display; and
    a plurality of vehicular peripheral devices coupled to and in bi-directional communication with the dual-mode controller;
    wherein the dual-mode controller is operative to switch between a master mode and slave mode responsive to the occurrence of both i) the detection of a user's personal handheld computing device, and ii) receipt of a command from a user to enter the slave mode,
    wherein, when in the master mode, the dual-mode controller serves as the user's exclusive interface with the vehicular peripheral devices,
    wherein, when in the slave mode, the dual-mode controller allows the user's personal handheld computing device to be a master controller for certain of the plurality of vehicular peripheral devices and to serve as the user's exclusive interface with the one or more of the plurality of vehicular peripheral devices, and
    wherein when in slave mode the dual-mode controller serves as a protocol translator, whereby the user's personal handheld computing device is enabled to communicate with the certain of the plurality of vehicular peripheral devices.

12. The system of claim 11, wherein the dual mode controller is configured to make a ported connection to an operating system of the user's personal handheld computing device.

13. The system of claim 11, wherein when in slave mode the dual-mode controller allows the user to interface with the certain of the plurality of vehicular peripheral devices via a human-machine interface of the user's personal handheld computing device.

14. The system of claim 11, wherein when in slave mode the dual-mode controller retains control of certain interface operations with the plurality of vehicular peripheral devices.

15. The system of claim 11, wherein a processing speed of the dual-mode controller is substantially lower than a processing speed of the user's personal handheld computing device, whereby the dual-mode controller is adapted for low-cost manufacture.

16. The system of claim 15, wherein a main memory access speed of the dual-mode controller is substantially lower than a main memory access speed of the user's personal handheld computing device, whereby the dual-mode controller is further adapted for low-cost manufacture.

17. The system of claim 11, wherein when in slave mode the dual-mode controller serves as a data router between the user's personal handheld computing device and the certain of the plurality of vehicular peripheral devices.

18. The system of claim 11, wherein the dual-mode controller is configured to improve the user's control of the certain of the plurality of vehicular peripheral devices by permitting the user to interface with those devices via an operating system of the user's personal handheld computing device.

19. The system of claim 11, wherein the dual-mode controller includes a plurality of various network protocol adapters each of which is configured to communicate unidirectionally or bidirectionally with one of the vehicular peripheral devices.

20. The system of claim 11, wherein the dual-mode controller arbitrates the transmission of data between the user's personal handheld computing device and the certain of the plurality of vehicular peripheral devices.

* * * * *